(12) United States Patent
Engelland-Gay et al.

(10) Patent No.: US 11,625,864 B2
(45) Date of Patent: Apr. 11, 2023

(54) COMPRESSION OF DYNAMIC UNSTRUCTURED POINT CLOUDS

(71) Applicant: Magic Leap, Inc., Plantation, FL (US)

(72) Inventors: Henry Engelland-Gay, Santa Monica, CA (US); Clay Heins, San Francisco, CA (US)

(73) Assignee: MAGIC LEAP, INC., Plantation, FL (US)

( * ) Notice: Subject to any disclaimer, the term of this patent is extended or adjusted under 35 U.S.C. 154(b) by 249 days.

(21) Appl. No.: 17/057,539

(22) PCT Filed: May 23, 2019

(86) PCT No.: PCT/US2019/033695
§ 371 (c)(1),
(2) Date: Nov. 20, 2020

(87) PCT Pub. No.: WO2019/226865
PCT Pub. Date: Nov. 28, 2019

(65) Prior Publication Data
US 2021/0192793 A1   Jun. 24, 2021

Related U.S. Application Data

(60) Provisional application No. 62/676,845, filed on May 25, 2018.

(51) Int. Cl.
| | | |
|---|---|---|
| G06T 9/00 | (2006.01) | |
| G06T 3/40 | (2006.01) | |
| G06T 17/20 | (2006.01) | |
| G06T 19/00 | (2011.01) | |

(52) U.S. Cl.
CPC ............... *G06T 9/001* (2013.01); *G06T 3/40* (2013.01); *G06T 17/20* (2013.01); *G06T 19/006* (2013.01)

(58) Field of Classification Search
None
See application file for complete search history.

(56) References Cited

U.S. PATENT DOCUMENTS

| | | |
|---|---|---|
| 6,850,221 B1 | 2/2005 | Tickle |
| 2006/0028436 A1 | 2/2006 | Armstrong |
| 2007/0081123 A1 | 4/2007 | Lewis |
| 2012/0127062 A1 | 5/2012 | Bar-Zeev et al. |
| 2012/0162549 A1 | 6/2012 | Gao et al. |

(Continued)

FOREIGN PATENT DOCUMENTS

| | | |
|---|---|---|
| WO | WO 2019/226865 | 11/2019 |
| WO | WO 2019/232075 | 12/2019 |

OTHER PUBLICATIONS

International Search Report and Written Opinion, re PCT Application No. PCT/US 19/33695, dated Aug. 16, 2019.

(Continued)

*Primary Examiner* — Tapas Mazumder
(74) *Attorney, Agent, or Firm* — Seed IP Law Group LLP

(57) ABSTRACT

Systems and methods for compressing dynamic unstructured point clouds. A plurality of destructive images of a dynamic unstructured point cloud can be captured from a plurality of viewpoints using one or more virtual cameras. One or more sequences of the destructive images can be formed. The one or more sequences of destructive images can then be compressed.

41 Claims, 12 Drawing Sheets

(56) References Cited

U.S. PATENT DOCUMENTS

| | | |
|---|---|---|
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0063024 A1 | 3/2014 | Zhang et al. |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0313527 A1* | 10/2014 | Askan ............... H04N 1/38 358/1.9 |
| 2015/0003723 A1* | 1/2015 | Huang ............... G06T 7/11 382/154 |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2017/0214943 A1 | 7/2017 | Cohen et al. |
| 2017/0228896 A1 | 8/2017 | Yu et al. |
| 2017/0249401 A1 | 8/2017 | Eckart et al. |
| 2017/0347100 A1* | 11/2017 | Chou ............... H03M 7/3059 |
| 2018/0144547 A1 | 5/2018 | Shakib et al. |
| 2020/0122405 A1* | 4/2020 | Bigos ............... G06T 19/20 |

OTHER PUBLICATIONS

International Preliminary Report for Patentability, re PCT Application No. PCT/US 19/33695, dated Dec. 1, 2020.
ARToolKit: https://web.archive.org/web/20051013062315/http://www.hitl.washington.edu:80/artooikit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Lien et al., "Skeleton-Based Compression of 3-D Tele-Immersion Data," ACM/IEEE International Conference on Distributed Smart Cameras, Sep. 25-28, 2007.
Tanriverdi and Jacob, "Interacting With Eye Movements in Virtual Environments," Department of Electical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

900

Volumetric Capture Data Rates

| Data Format | Approx. Data Rate (Gbps) |
|---|---|
| Raw RGB Images | 177 |
| Compressed RGB Videos | 3.1 |
| Raw Point Clouds | 1.2 |
| Compressed RGBD Video | 0.35 |

FIG. 9

COMPRESSION OF DYNAMIC UNSTRUCTURED POINT CLOUDS

INCORPORATION BY REFERENCE TO ANY PRIORITY APPLICATIONS

This application claims priority to U.S. Provisional Patent Application No. 62/676,845, filed May 25, 2018, and entitled "COMPRESSION OF DYNAMIC UNSTRUCTURED POINT CLOUDS." Any and all applications for which a foreign or domestic priority claim is identified above and/or in the Application Data Sheet as filed with the present application are hereby incorporated by reference under 37 CFR 1.57.

BACKGROUND

Field

This disclosure relates to point clouds, such as those Which may be used in image data for virtual reality, augmented reality, and mixed reality visualization systems.

Description of the Related Art

Modern computing and display technologies have facilitated the development of virtual reality, augmented reality, and mixed reality systems. Virtual reality, or "VR," systems create a simulated environment for a user to experience. This can be done by presenting computer-generated image data to the user through a head-mounted display. This image data creates a sensory experience which immerses the user in the simulated environment. A virtual reality scenario typically involves presentation of only computer-generated image data rather than also including actual real-world image data.

Augmented reality systems generally supplement a real-world environment with simulated elements. For example, augmented reality, or "AR," systems may provide a user with a view of the surrounding real-world environment via a head-mounted display. However, computer-generated image data can also be presented on the display to enhance the real-world environment. This computer-generated image data can include elements which are contextually-related to the real-world environment. Such elements can include simulated text, images, subjects, etc. Mixed reality, or "MR," systems are a type of AR system which also introduce simulated objects into a real-world environment, but these objects typically feature a greater degree of interactivity. The simulated elements can often times be interactive in real time.

FIG. 1 depicts an example AR/MR scene 100 where a user sees a real-world park setting 110 featuring people, trees, buildings in the background, and a platform 120. In addition to these items, computer-generated image data is also presented to the user. The computer-generated image data can include, for example, a robot statue 130 standing upon the real-world platform 120, and a cartoon-like avatar character 140 flying by which seems to be a personification of a bumblebee, even though these elements 130, 140 are not actually present in the real-world environment.

SUMMARY

In some embodiments, a method comprises: capturing a plurality of destructive images of a dynamic unstructured point cloud from a plurality of viewpoints using one or more virtual cameras; forming one or more sequences of the destructive images; and compressing the one or more sequences of destructive images.

In some embodiments, a system comprises: a hardware computing device; and a memory configured to store a dynamic unstructured point cloud and instructions which, when executed by the hardware computing device, cause the hardware computing device to perform a method comprising: capturing a plurality of destructive images of the dynamic unstructured point cloud from a plurality of viewpoints using one or more virtual cameras; forming one or more sequences of the destructive images; and compressing the one or more sequences of destructive images.

In some embodiments, a non-transitory computer-readable medium comprises instructions which, when read by a hardware computing device, cause the hardware computing device to perform a method comprising: capturing a plurality of destructive images of a dynamic unstructured point cloud from a plurality of viewpoints using one or more virtual cameras; forming one or more sequences of the destructive images; and compressing the one or more sequences of destructive images.

BRIEF DESCRIPTION OF THE DRAWINGS

FIG. 9 is a table which illustrates example data rates for the raw data produced by a volumetric capture system, as well as example data rates associated with different compression techniques.

DETAILED DESCRIPTION

Virtual reality (VR), augmented reality (AR) and mixed reality (MR) systems can include a display which presents computer-generated image data (e.g., still images and/or videos) to a user. In some embodiments, the display systems are wearable, which may advantageously provide a more immersive VR/AR/MR experience. The computer-generated image data provided via the display can create the impression of being three-dimensional. This can be done, for example, by presenting stereoscopic image data to the user or by projecting image data such that it appears to have originated from different apparent depth planes.

Figure 1:
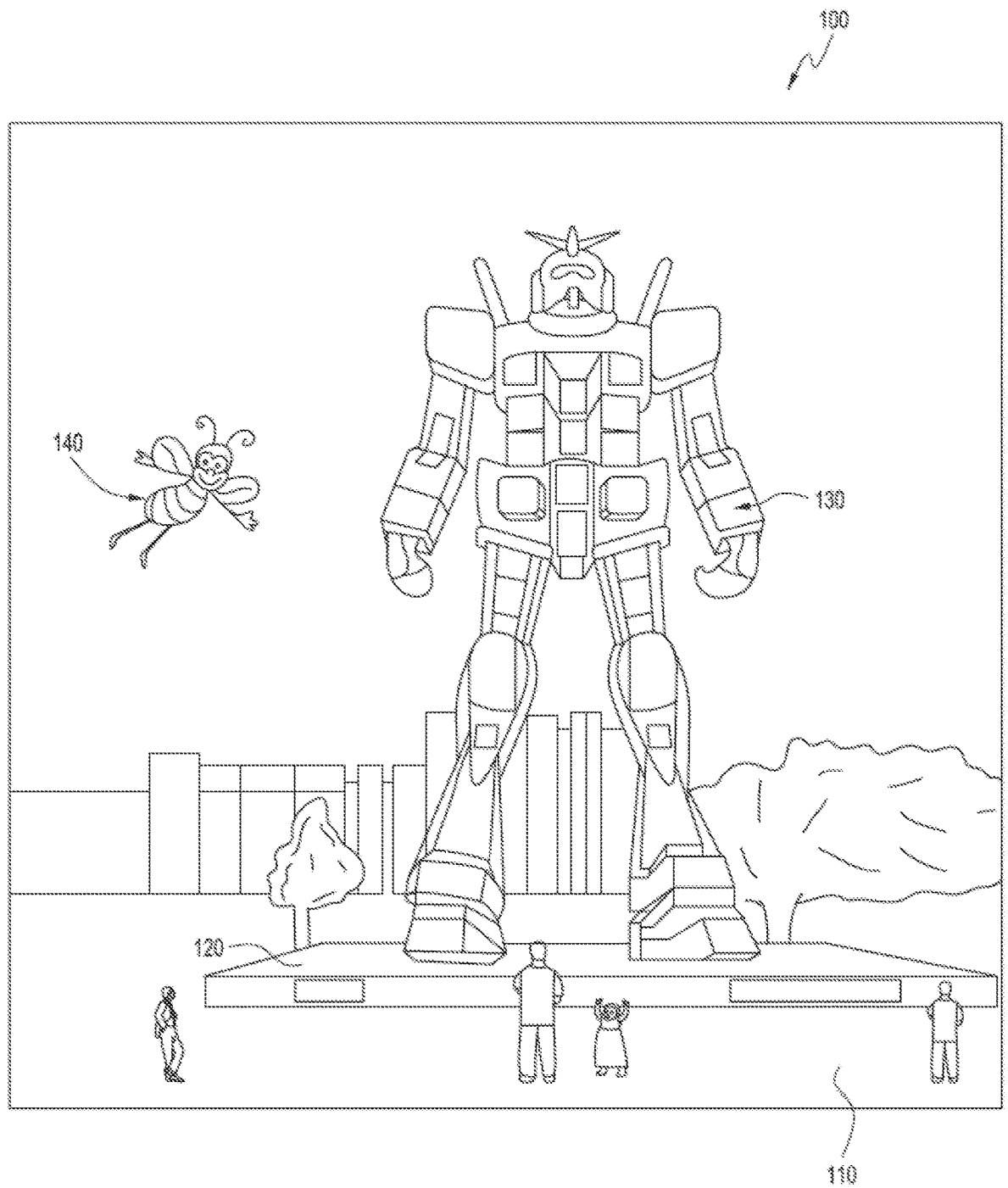
FIG. 1 illustrates a user's view of an augmented reality (AR) scene using an example AR system.
Figure 2:
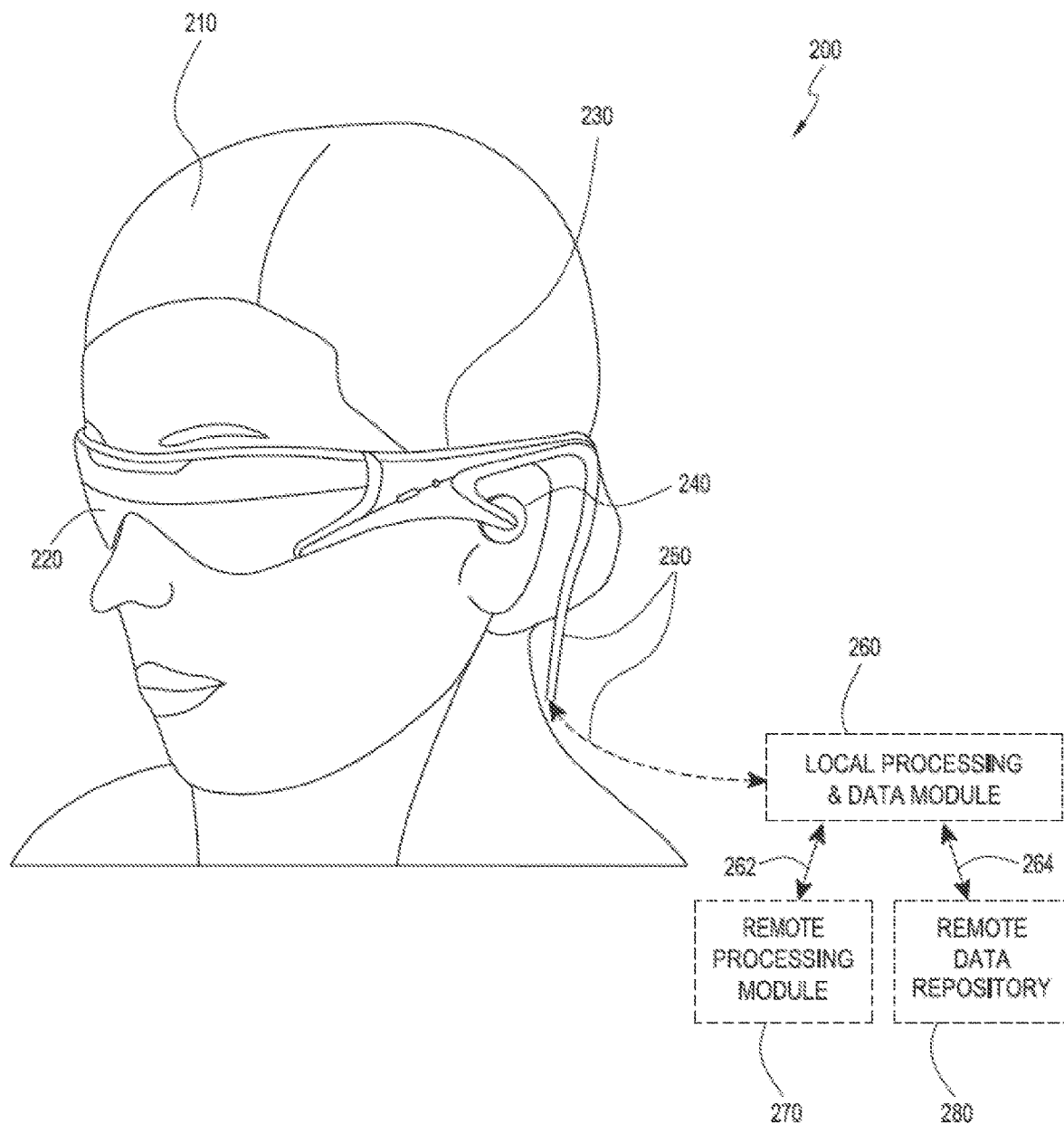
FIG. 2 illustrates an example of a wearable VR/AR/MR display system.

FIG. 2 illustrates an example of a wearable VR/AR/MR display system 200. The VR/AR/MR display system 200 includes a display 220, and various mechanical and electronic modules and systems to support the functioning of that display 220. The display 220 may be coupled to a frame 230, which is wearable by a user 210 and which positions the display 220 in front of the eyes of the user 210. A speaker 240 can be coupled to the frame 230 and positioned adjacent the ear canal of the user. Another speaker, not shown, can be positioned adjacent the other ear canal of the user to provide for stereo/shapeable sound control. The display 220 is operatively coupled, such as by a wired or wireless connection 250, to a local processing and data module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration, etc.).

The local processing and data module 260 may include a processor, as well as digital memory, such as non-volatile memory (e.g., flash memory), both of which may be utilized to assist in the processing and storing of data. This includes data captured from sensors, such as image capture devices (e.g., cameras), microphones, inertial measurement units, accelerometers, compasses, GPS units, radio devices, and/or gyros. The sensors may be operatively coupled to the frame 230 or otherwise attached to the user 210. In some embodiments, all data is stored and all computations are perforated in the local processing and data module 260, allowing fully autonomous use. Alternatively, or additionally, sensor data may be acquired and/or processed using a remote processing module 270 and/or remote data repository 280. The local processing and data module 260 may be operatively coupled by communication links (262, 264), such as via a wired or wireless communication links, to the remote processing module 270 and the remote data repository 280 such that these remote modules (270, 280) are operatively coupled to each other and available as resources to the local processing and data module 260. In some embodiments, the remote processing module 270 may include one or more processors configured to analyze and process data (e.g., sensor data and/or image information). The remote data repository 280 may be a digital data storage facility, which may be available through the internet or other networking configuration in a "cloud" resource configuration.

With access to suitable image data, the VR/AR/MR system 200 is capable of displaying 360° views of a subject (e.g., a person, object, etc.) such that the user 210 can move around the subject and view it from any perspective as if it were physically present. One type of image data that can enable this functionality is a point cloud. A point cloud is a data structure for representing three-dimensional (3-D) surfaces. In particular, a point cloud includes information about the locations of spatial samples of one or more surfaces of a subject. The point cloud may also include values which indicate the brightness of the surface(s), at or near the locations of the spatial samples, in one or more color channels (e.g., red, green, and blue color channels). A point cloud can be structured or unstructured, and either static or dynamic.

A structured point cloud includes information about the locations of spatial samples of one or more surfaces of the subject as seen from a single viewpoint. A red-green-blue-depth image (i.e., an RGB-D, or simply RGBD, image) is an example representation of a structured point cloud. An RGBD image is made up of numerous pixels, each of which represents a point in the image plane of an imaging device, such as an RGBD camera, that corresponds to a point in object space within the field of view of the imaging device. In an RGBD image, each pixel is associated with red, green, and blue brightness values for the corresponding point in object space. In addition, each pixel is associated with a depth value which represents an indicator, such as a measurement, of the distance from the image plane of the imaging device to the corresponding point in object space. An RGBD camera captures information about the visible fronto-parallel surface(s) of the subject being imaged, as seen from the camera viewpoint, but generally does not capture information regarding other surfaces of the subject.

A static structured point cloud represents the locations, with respect to a single viewpoint, of spatial samples of surfaces of the subject at an instant in time. Meanwhile, a dynamic structured point cloud represents the locations, with respect to a single viewpoint, of spatial samples of surfaces of the subject at multiple instants of time. A dynamic structured point cloud representing a subject may consist of, for example, a time sequence of multiple static structured point clouds of the subject (e.g., multiple frames per second).

An unstructured point cloud includes information about the locations of spatial samples of a subject as seen from multiple viewpoints. For example, an unstructured point cloud may include 3-D coordinates of spatial samples of many, if not all, surfaces of the subject. An unstructured point cloud may also include values which indicate the surface brightness of the subject in one or more color channels (e.g., red, green, and blue color channels) at or near the locations of the spatial samples. Unstructured point clouds can be generated by, for example, 3-D scanning systems or by appropriately merging multiple structured point clouds of a subject taken from different viewpoints. This can be done using, for example, photogrammetry or Simultaneous Localization and Mapping (SLAM) algorithms.

Figure 3:
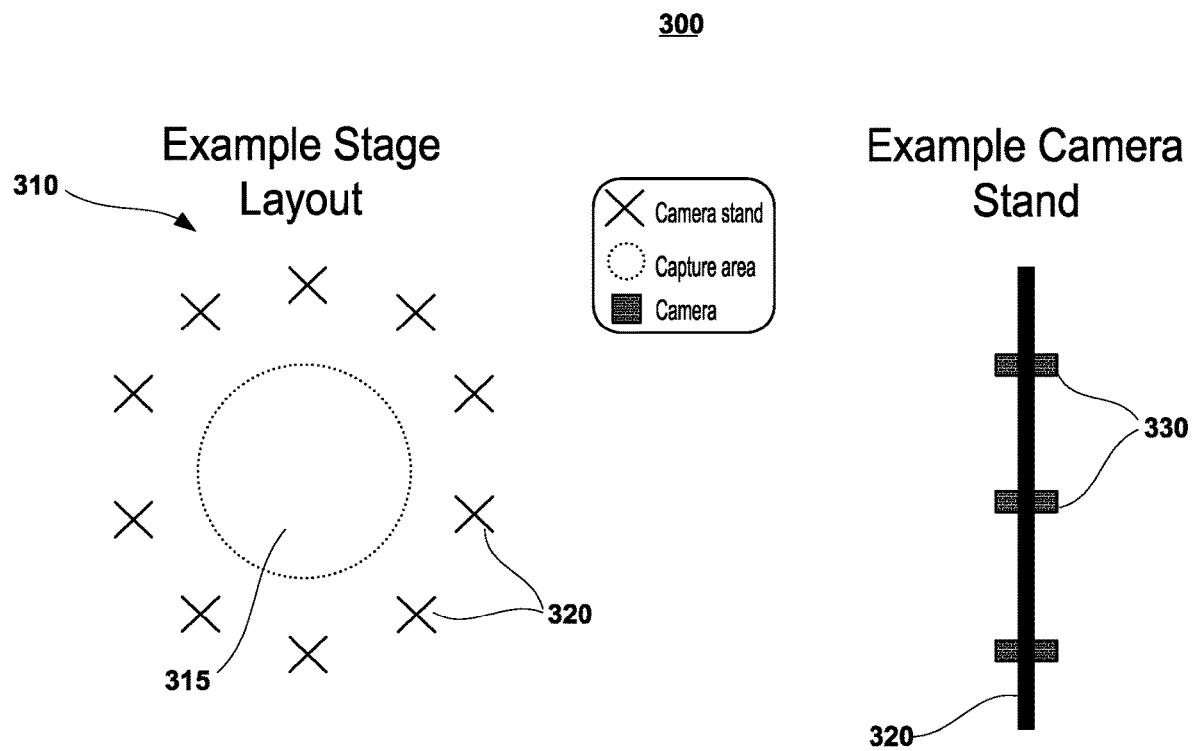
FIG. 3 is a schematic diagram which illustrates an example volumetric capture system for generating dynamic unstructured point clouds.

A static unstructured point cloud represents the locations of spatial samples of the surfaces of a subject, as seen from multiple—or possibly all—viewpoints, at an instant in time. Meanwhile, a dynamic unstructured point cloud represents the locations of spatial samples of the surfaces of the subject at multiple instants of time. A dynamic unstructured point cloud of a subject may consist of, for example, a time sequence of multiple static unstructured point clouds of that subject (e.g., multiple frames per second, or more). FIG. 3 illustrates one technique for generating dynamic unstructured point clouds of a subject.

FIG. 3 is a schematic diagram which illustrates an example volumetric capture system 300 for generating dynamic unstructured point clouds. The system 300 is located in an environment 310, which is typically a green screen room. A green screen room is a room with a capture volume 315 surrounded by green screens of the type used in chroma key compositing, which is a post-production video processing technique for compositing images or videos based on their color content.

The system 300 includes a plurality of camera stands 320 spread around the perimeter of the capture volume 315 at different locations. Each camera stand 320 can include multiple video cameras 330 mounted at different vertical heights, with the video cameras being aimed radially inward toward the capture volume 315. In this way, each of the video cameras 330 can film a subject in the capture volume 315 from a different viewpoint. In a typical embodiment of a volumetric capture system 300, the field of view of each of the video cameras 330 overlaps with those of adjacent video cameras so as to provide complete coverage of the subject being filmed in the capture area 315.

In some embodiments, the video cameras 330 are synchronized RGB video cameras. In other embodiments, the video cameras 330 are synchronized RGBD video cameras which each capture a representation of a dynamic structured point cloud of the subject in the capture volume 315. These dynamic structured point clouds, which are captured from different viewpoints, can then be mathematically combined and interpolated by a processor so as to construct a dynamic 3-D model of the subject. The 3-D model can be used to represent the subject from many, or all, viewpoints, including ones which were not actually filmed by the video cameras 330. The 3-D model can take various forms, including a polygon mesh, but a typical form of the 3-D model is a dynamic unstructured point cloud of the subject.

A dynamic unstructured point cloud can be used in the VR/AR/MR system 200 to permit the user 210 to experience the subject from many different viewpoints over time. Dynamic unstructured point clouds, such as those captured with volumetric capture techniques, offer the possibility of providing a very immersive VR/AR/MR experience. But one difficulty with volumetric capture techniques is that the raw video (e.g., RGB or RGBD video) captured by the video cameras 330, as well as the dynamic unstructured point cloud created from the raw video data, can include large amounts of data which can consume excessive amounts of computer memory and storage. There are competing interests between providing the user 210 with an immersive VR/AR/MR experience versus being able to store the large quantities of image data that may be required to provide that immersive experience. There is thus a need for compression techniques to reduce file sizes associated with dynamic unstructured point clouds.

A dynamic unstructured point cloud may exhibit both temporal and spatial redundancies. For example, some of the points in the cloud may be temporally correlated with others. In addition, the positions of some points may be inferred based on the positions of neighboring points. These temporal and spatial redundancies can be leveraged to reduce the amount of data needed to represent a dynamic unstructured point cloud (though video quality constraints may limit the amount of data compression that is possible).

Figure 4:
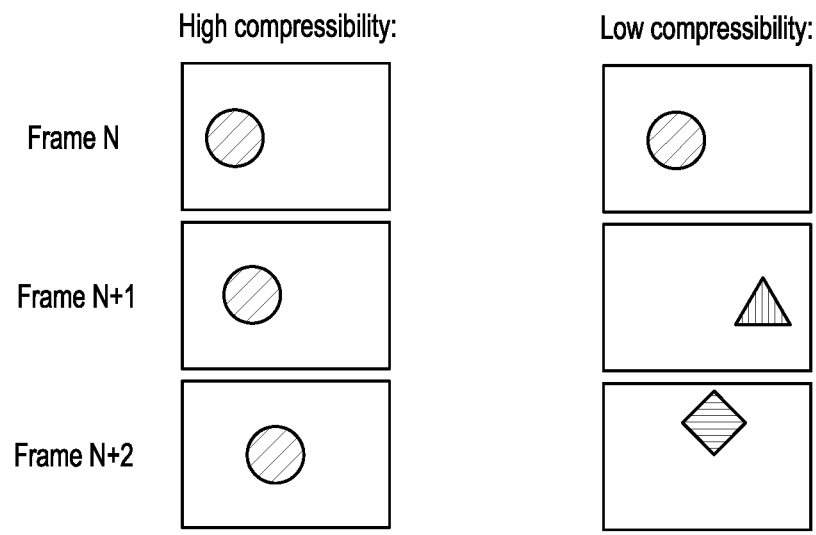
FIG. 4 is a diagram which illustrates that temporal coherency improves the compressibility of a video.

FIG. 4 is a diagram 400 which illustrates that temporal coherency improves the compressibility of a video. The diagram 400 includes two columns of video frames. The left-hand column shows three consecutive frames (beginning at frame N) of a sample video. Each of the three video frames in the left-hand column includes a common image feature—in this case, a circle—that changes position in an incremental way from one frame to the next. This temporal coherence, or consistency (i.e., small changes between frames), improves the compressibility of the sample video represented by the frames in the left-hand column. Meanwhile, the right-hand column of the diagram 400 likewise includes three consecutive frames (beginning at frame N) of a sample video. However, the frames in the right-hand column include different image features—a circle, a triangle, and a diamond, respectively—and those image features do not have any temporal coherence from one frame to the next. This lack of temporal coherence reduces the compressibility of the sample video represented by the frames in the right-hand column.

Although FIG. 4 illustrates that temporal coherency improves the compressibility of a 2-D video, the same is also true of a dynamic structured point cloud (e.g., an RGBD video), such as those which may be captured by the individual video cameras 330 in the volumetric capture system 300. As a result, existing video compression techniques could be used to compress these individual dynamic structured point cloud representations, as described by Nenci et al., in "Effective compression of range data streams for remote robot operations using H.264," 2014 IEEE/RSJ International Conference on Intelligent Robots and Systems; and by Coatsworth et al., in "A hybrid lossless and lossy compression scheme for streaming RGB-D data in real time," 2014 IEEE International Symposium on Safety, Security, and Rescue Robotics, each of which is hereby incorporated by reference herein in its entirety. Examples of such video compression techniques include the H.264 (MPEG-4 Part 10, Advanced Video Coding) standard, the H.265 (MPEG-H Part 2, High Efficiency Video Coding) standard, the QuickTime RLE standard, etc. Although direct compression of RGBD videos captured by the individual video cameras 330 in the volumetric capture system 300 would take advantage of temporal redundancies, this methodology would fail to take advantage of spatial redundancies which result from the fact that the field of view of each of the video cameras 330 generally overlaps those of other cameras, resulting in repeated information.

Other techniques which employ spatial data structures, such as octrees, for compressing static unstructured point clouds may take advantage of redundant spatial information. Those compression techniques could therefore be used to individually compress each of the static unstructured point clouds in the sequence which makes up the dynamic unstructured point cloud, but this compression methodology would fail to take advantage of temporal redundancies that may exist from one frame to the next.

This disclosure describes an improved technique for compressing dynamic unstructured point clouds. In some embodiments, the improved technique involves mapping an unstructured point cloud into one or more structured point cloud representations, such as RGBD images. This can be done in a manner which, when applied to a temporal sequence of static unstructured point clouds (e.g., a dynamic unstructured point cloud), results in one or more sequences of structured point cloud representations (e.g., one or more RGBD videos) which are well-suited for existing video compression algorithms because they are likely to exhibit temporal coherency across local image regions. Thus, the resulting sequence(s) of structured point cloud representations can then be compressed using existing video compression techniques, such as H.265, QuickTime RLE, etc. Later, the compressed structured point cloud representations can be decoded and the RGBD sequence(s) can be used, along with a small amount of metadata, to reconstruct the original dynamic unstructured point cloud in real-time for rendering on any viewing device.

The techniques described herein are advantageous in that they enable widely-studied techniques for compressing video data, such as dynamic structured point clouds, to be applied in an improved way to the problem of compressing dynamic unstructured point clouds. The techniques shift the problem from one of inventing a new form of compression to one of mapping one data representation to another. Although the techniques described herein are well-suited for compressing dynamic unstructured point clouds (e.g., temporal sequences of static unstructured point clouds), they can also be used to compress individual static unstructured point clouds.

Figure 5A:
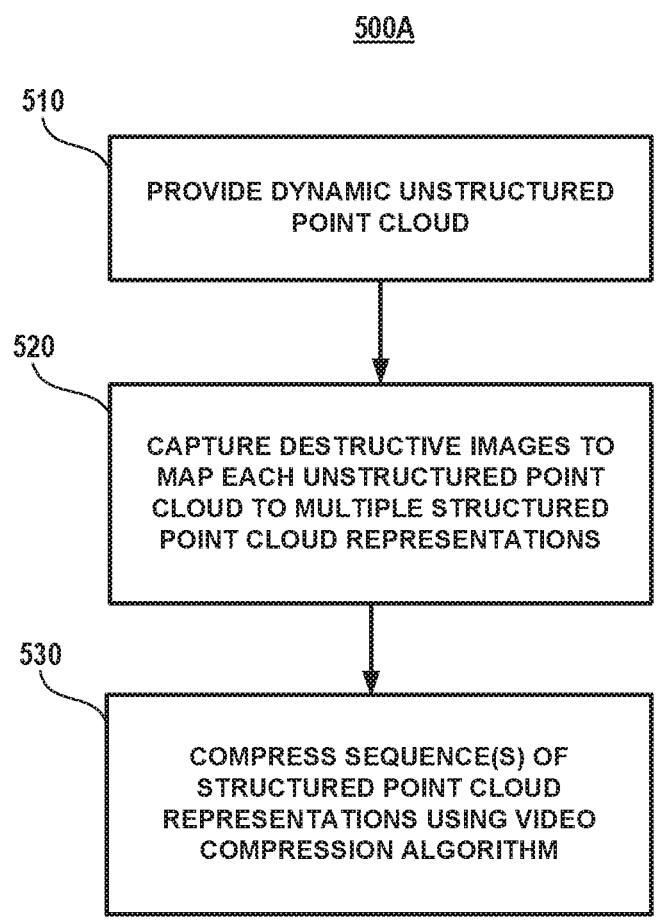
FIG. 5A is a flowchart of an example method for encoding a dynamic unstructured point cloud into a compressed format.

FIG. 5A is a flowchart of an example method 500A for encoding a dynamic unstructured point cloud into a compressed format. In some embodiments, this and other methods described herein can be carried out by a computer processor which executes programmed instructions stored in non-transitory computer memory.

The method 500A begins at block 510 where the computer processor provides, or is provided with, a dynamic unstructured point cloud of a subject. The dynamic unstructured point cloud can be made up of a sequence of static unstructured point clouds of the subject from different moments in time. The dynamic unstructured point cloud can be produced as, for example, the processed end result of the volumetric capture system 300.

Then, at block 520, the computer processor captures destructive images of each of the static unstructured point clouds in the sequence. The destructive images are captured using one or more virtual cameras positioned at different locations around the unstructured point cloud. The virtual camera(s) can be used to map each of the static unstructured point clouds into one or more static structured point cloud representations, such as RGBD images.

When a virtual camera is pointed, by the computer processor, toward a static unstructured point cloud in the sequence, one or more surfaces of the subject will be visible to the virtual camera. When the virtual camera captures a destructive image of the point cloud, those points in the cloud which belong to the surface(s) of the subject that are visible to the virtual camera are projected onto the virtual camera's image plane in much the same way as would occur in the case of an actual physical camera imaging the subject. The virtual camera records the position at which each point from the point cloud is projected onto the image plane, as well as the distance from each point to the image plane. The virtual camera can also record the brightness values associated with each point in one or more color channels, such as red, green, and blue color channels. All of this information can be recorded as, for example, an RGBD image. Once the virtual camera captures an image of a static unstructured point cloud in the sequence, those points from the point cloud which were imaged are eliminated from that particular static point cloud. Hence the reason these images are referred to herein as destructive images. The process can be repeated, with destructive images being captured from different viewpoints, until that entire static unstructured point cloud in the sequence has been eliminated. The same point cloud destruction process can be carried out for each of the static unstructured point clouds in the sequence which makes up the dynamic unstructured point cloud.

At block 530 of the method 500A, the computer processor can form one or more time sequences of the destructive images to produce, for example, one or more RGBD videos. This results in one or more dynamic structured point clouds, which can then be compressed using video compression algorithms, such as H.264, H.265, QuickTime RLE, and others.

As discussed further herein, the viewpoints of the virtual cameras can be selected in ways which reduce spatial redundancies and increase temporal coherency in the sequence(s) of destructive images. The reduction in spatial redundancies decreases the amount of information that has to be compressed, and the increase in temporal coherency improves the effectiveness of the video compression algorithms, thereby allowing a higher degree of compression to be achieved.

Figure 5B:
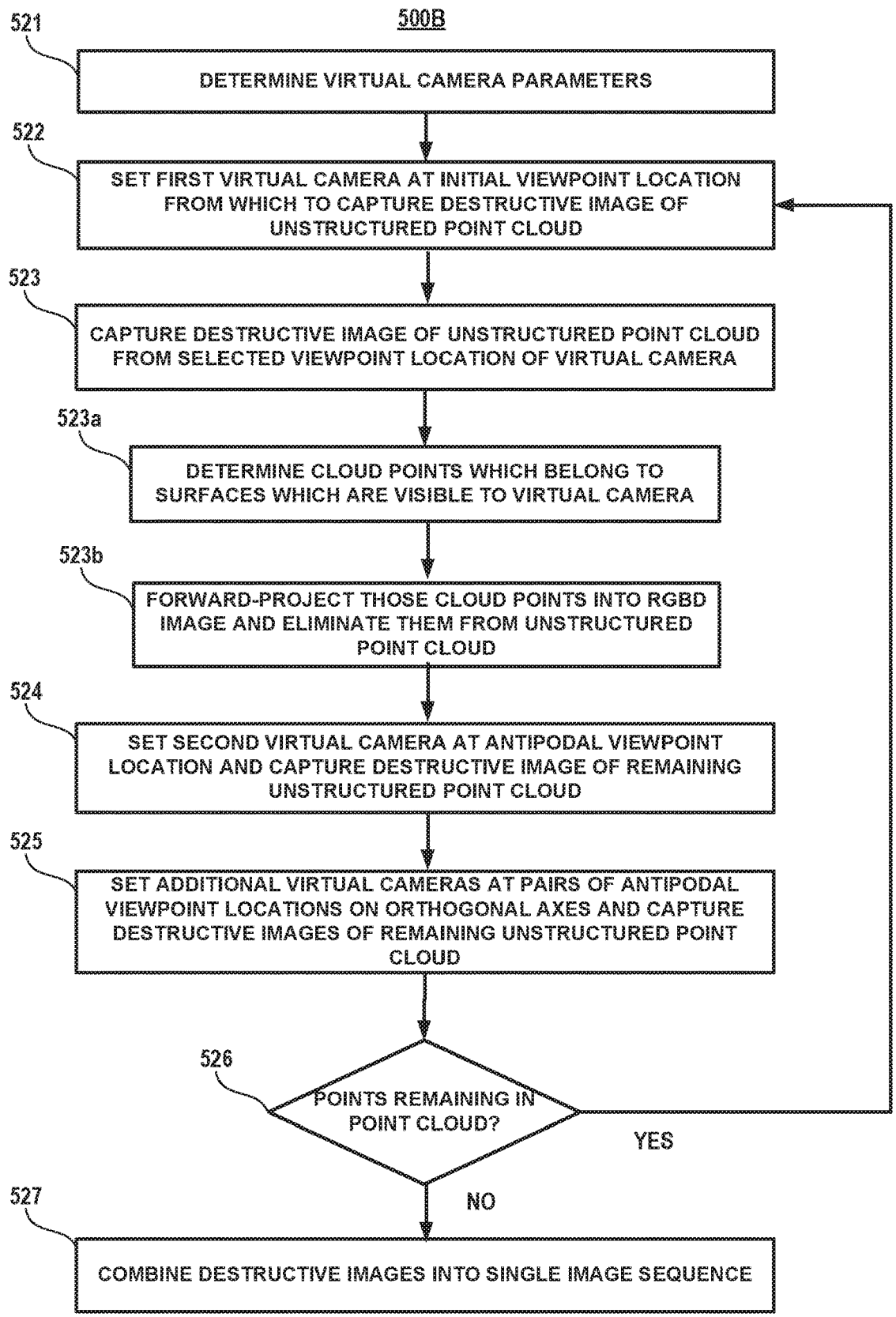
FIG. 5B is a flowchart of an example method for capturing destructive images of an unstructured point cloud.

FIG. 5B is a flowchart of an example method 500B for capturing destructive images of an unstructured point cloud. This method can be used as part of block 520 in FIG. 5A. Since this method uses multiple virtual cameras located at different viewpoint positions, or a single virtual camera moved from one viewpoint position to the next, a description of the virtual camera(s) is first provided.

The virtual camera(s) can mimic the operation of a physical camera. Similar to how a physical camera images a 3-D object space to a 2-D image space, the virtual camera(s) use mathematical projection models to project points from the 3-D space of the point cloud to a virtual 2-D image plane. The 2-D image plane of the virtual camera(s) can be discretized into an array of pixels. When a point from the point cloud is projected to a particular pixel in the image plane of a virtual camera, the distance from the point to the image plane, along with any RGB values for that point, can be recorded and associated with the coordinates of the pixel. In this way, a structured point cloud representation, such as an RGBD image, can be formed.

In some embodiments, the virtual camera(s) use a pinhole projection model, which generally mimics the operation of a physical pinhole camera. A pinhole virtual camera has an optical center point. Each point from the point cloud which belongs to a surface that is visible to the virtual camera is projected along a straight line through the optical center point to the pixel where the straight line intersects the image plane. This is referred to as a forward-projection. A point from the point cloud can be restored by projecting the location of its corresponding pixel along a straight line through the optical center point of the virtual camera and into the 3-D space of the point cloud. The specific location of the restored point along this straight line can be set based on the distance which was associated with the corresponding pixel during the forward-projection process. This is referred to as a back-projection. While some embodiments of the virtual camera(s) use a pinhole projection model, other projection models can be used in other embodiments.

The method 500B begins at block 521 where the computer processor determines the intrinsic parameters of the virtual camera(s). One example intrinsic parameter of the virtual camera(s) is focal length. The focal length can be flexibly chosen since changing it will mainly affect the distance from the center of the dynamic unstructured point cloud at which the virtual camera is placed so as to view the entire cloud. (In some embodiments, the center of the dynamic unstructured point cloud can be determined by calculating its centroid, or average location of all of the points.) By the same token, the field of view of the virtual camera(s) can also be flexibly chosen, for the same reason. The distance from the virtual camera(s) to the center of the dynamic unstructured point cloud can be directly related to the focal length and field of view. As focal length increases, the same or similar image frame can be maintained by increasing the distance of the virtual camera to the point cloud and/or adjusting the field of view as needed.

The resolution of the virtual camera(s) is another example of an intrinsic parameter which can be selected to suit a particular application. The resolution of the virtual camera(s) can be determined by the number, density, and/or spacing of the discrete pixels in the virtual camera's image plane. The resolution of the virtual camera(s) can be used to adjust the degree of compression that is ultimately achieved. This can be understood from the fact that, when the dynamic unstructured point cloud is ultimately reconstructed using the destructive images captured by the virtual camera(s), each pixel in each destructive image can only yield one point in the reconstructed point cloud. Thus, virtual cameras with higher resolution are typically capable of yielding higher reconstructed fidelity of the unstructured point cloud and a lower compression ratio. This is due to the fact that if the virtual camera(s) have a higher resolution, then there is a greater probability that, during the forward-projection process, each point from the point cloud will be mapped to a different pixel in the image plane of the virtual camera. This means each point can therefore be restored when the point cloud is reconstructed.

Conversely, virtual cameras with lower resolution typically yield lower reconstructed model fidelity and a higher compression ratio. In the case of lower virtual camera resolution, there is a greater probability that, during the forward-projection process, more than one point from the point cloud will be mapped to the same pixel. When this occurs, only a single one of those points can be restored when the point cloud is reconstructed. When a single point from the point cloud is restored from multiple original points, there is a reduction in the fidelity of the reconstructed point cloud. The resolution of the virtual camera(s) can be flexibly chosen based upon the desired compression ratio and/or the desired fidelity of the reconstructed point cloud.

In some embodiments, the intrinsic parameters are the same for all of the virtual cameras. In other embodiments, different virtual cameras can have different intrinsic parameters.

Figure 5C:
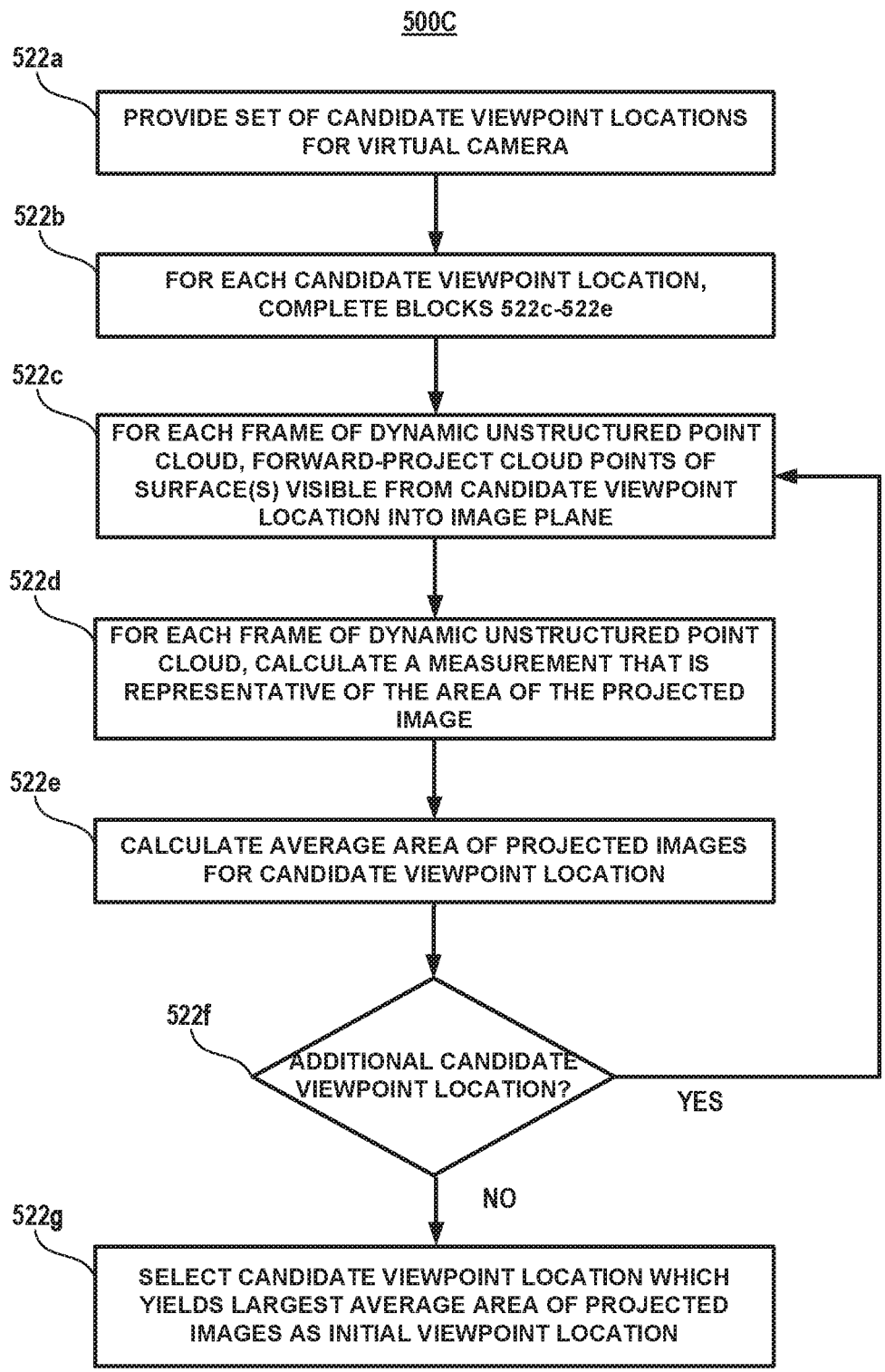
FIG. 5C is a flowchart of an example method for selecting the initial viewpoint location of the virtual camera used to capture the first destructive image for each frame of the dynamic unstructured point cloud.

The method 500B illustrated in FIG. 5B continues at block 522, where the computer processor sets the initial virtual camera viewpoint location from which the first destructive image of each static unstructured point cloud in the sequence is captured. FIG. 5C, discussed below, illustrates an example method for selecting this initial viewpoint location. The computer processor can also determine the pointing angle of the virtual camera at any given viewpoint location by, for example, aiming the optical axis of the virtual camera toward the center of the point cloud.

Next, at block 523, the computer processor captures a destructive image of the unstructured point cloud from the initial viewpoint location selected in block 522. This can be accomplished according to the method illustrated by sub-blocks 523a and 523b. At sub-block 523a, the computer processor determines which of the points belong to surfaces which are visible from the selected viewpoint location of the virtual camera. In some embodiments, this can include generating a polygon mesh from the unstructured point cloud to define the surfaces of the subject. Then, the points that belong to surfaces which are visible to the virtual camera can be identified by casting a ray from each point toward the virtual camera and determining whether the ray intersects one of the polygons in the mesh. If the ray does not intersect any polygon in the mesh, then it is visible to the virtual camera. Other ways for determining which points belong to surfaces which are visible to the virtual camera can include constructing one or more implicit surfaces by way of one or more signed distance fields, or using point splatting techniques.

Next, at sub-block 523b, the computer processor can forward-project the points identified in sub-block 523a into the imaging plane of the virtual camera to form an RGBD image. The projected points can then be eliminated from the particular static unstructured point cloud being imaged.

When a destructive image is taken of a static unstructured point cloud in the sequence, the fronto-parallel surface of the point cloud relative to the viewpoint of the virtual camera is eliminated. The remaining points in the cloud may fall into one of three categories: (1) the reverse-fronto-parallel surface; (2) surfaces generally orthogonal to the virtual camera's optical axis; and (3) interior self-occluded surfaces. All such points can be captured by taking a series of destructive images from other viewpoints in space around the unstructured point cloud.

For example, at block 524, the computer processor can position a virtual camera at the antipode of the viewpoint location from which the first destructive image was captured. This results in the capture and subsequent elimination of the reverse-fronto-parallel surface from the point cloud.

The first viewpoint location (used to capture the first destructive image of a static unstructured point cloud in the dynamic unstructured point cloud sequence) and its antipode (used to capture a subsequent destructive image of the static unstructured point cloud) together define a first axis which connects the two viewpoint locations. At block 525, the computer processor can set virtual cameras at antipodal pairs of viewpoint locations whose axes are mutually perpendicular to the first axis and to each other. Destructive images can be captured from each of these viewpoint locations. The example method in FIG. 5C, discussed below, can be used for selecting these viewpoint locations, as well.

Figure 5D:
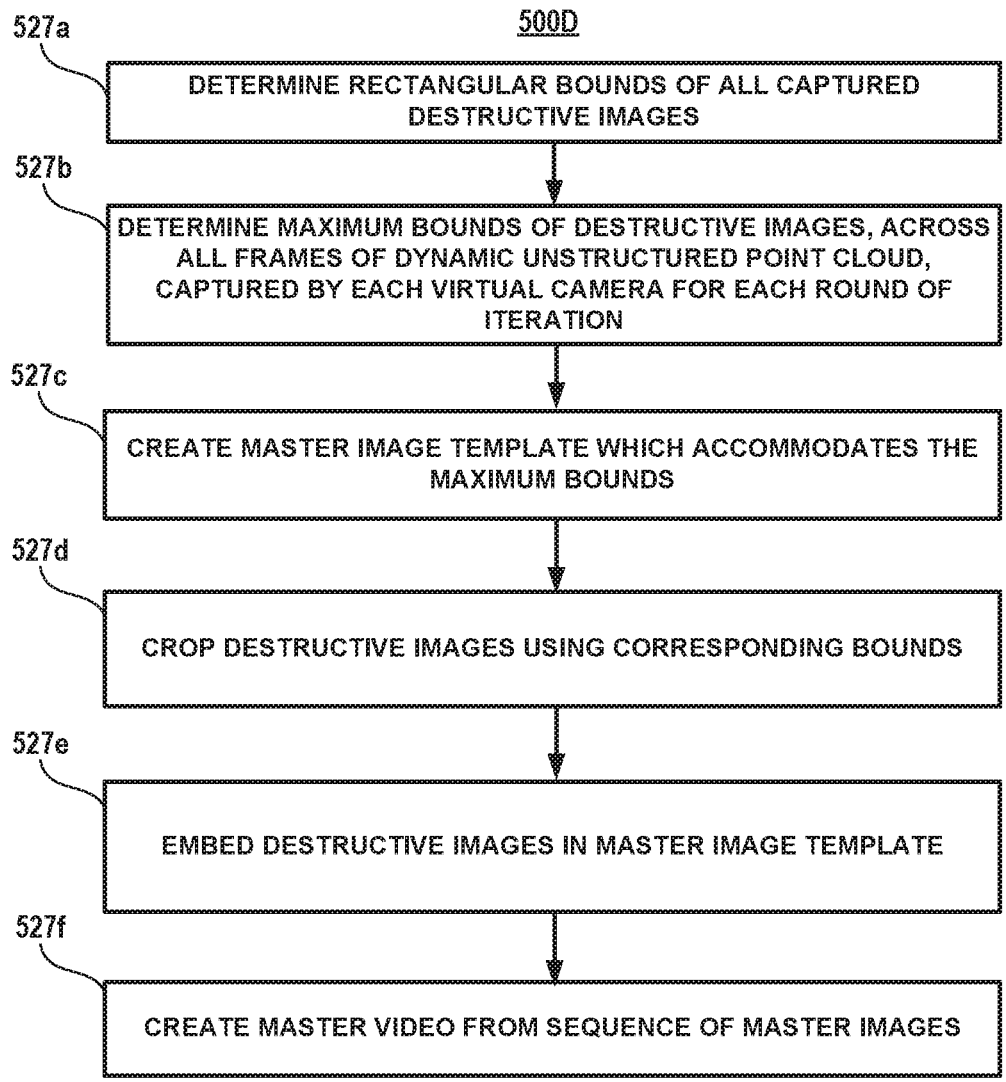
FIG. 5D is a flowchart of an example method for mapping multiple destructive RGBD images of a dynamic unstructured point cloud into a single master RGBD video.
Figure 6:
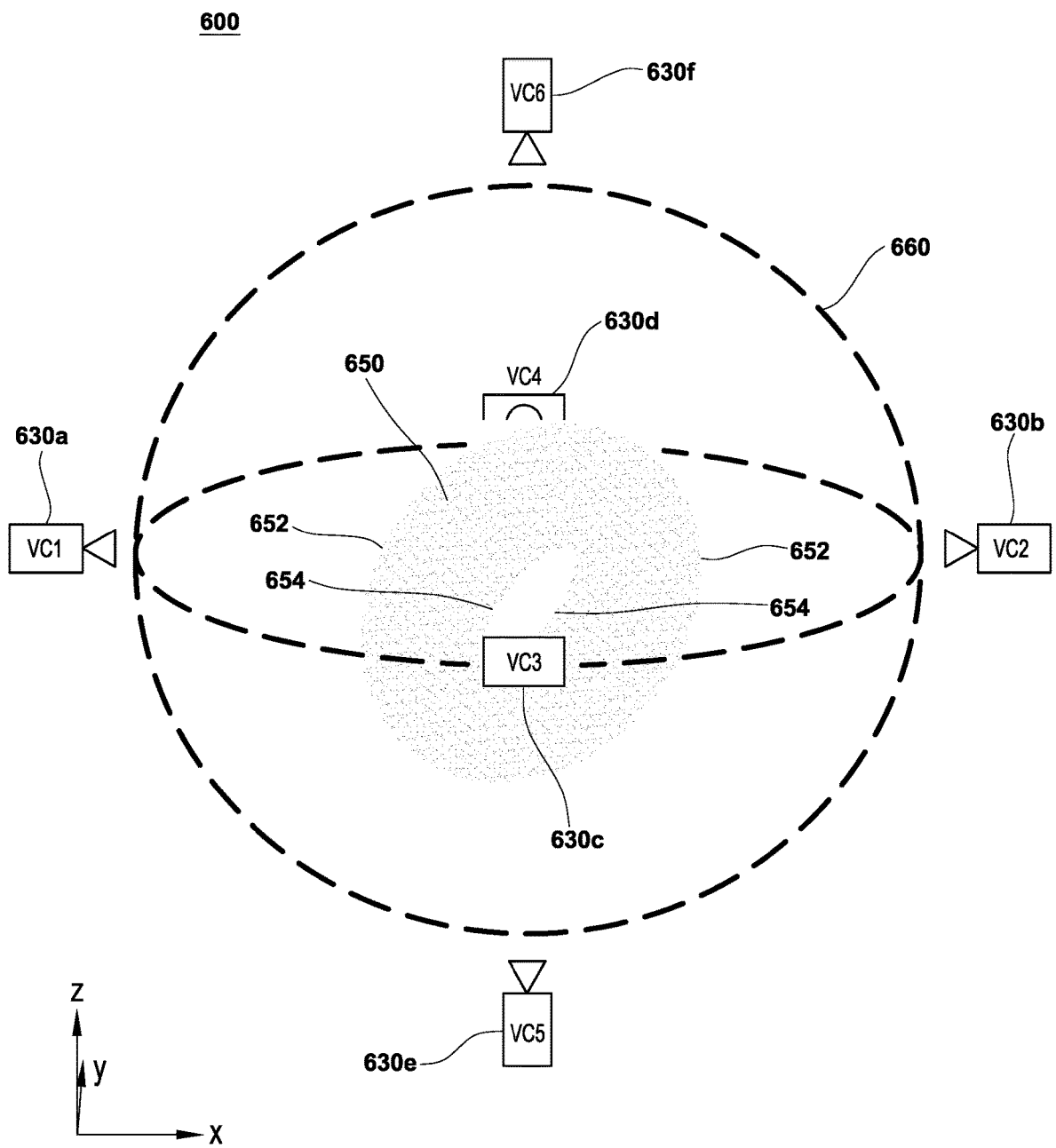
FIG. 6 is a diagram which illustrates some aspects of the example methods shown in FIGS. 5A-5D for compressing a dynamic unstructured point cloud.

FIG. 6 is a diagram 600 which illustrates some aspects of the example methods shown in FIGS. 5A-5D for compressing a dynamic unstructured point cloud. FIG. 6 shows a view of an unstructured point cloud of a toroidal object 650. FIG. 6 also shows multiple virtual cameras 630 pointed at the toroidal object 650 from different viewpoint locations around a sphere 660 which is centered at the centroid of the toroidal object. Specifically, a first virtual camera 630a is shown on the left side of the toroidal object 650, pointing at it in the x-direction. A second virtual camera 630b is shown on the right side of the toroidal object 650, pointing at it in the −x-direction. The first and second virtual cameras 630a, 630b are substantially diametrically opposed from one another on the sphere 660 and therefore form an antipodal pair. In some embodiments, their respective optical axes are substantially collinear. In the illustrated example, they are shown being aligned with the x-axis. The first and second virtual cameras 630a, 630b are examples, respectively, of the virtual cameras referenced in blocks 522 and 524 in FIG. 5B.

FIG. 6 also shows a third virtual camera 630c in front of the toroidal object 650, pointing at it in the y-direction, and a fourth virtual camera 630d behind the toroidal object, pointing at it in the −y-direction. The third and fourth virtual cameras 630c, 630d form a second pair of antipodal virtual cameras. Their optical axes can be substantially collinear, and in this case they are illustrated as being aligned with the y-axis. Finally, FIG. 5B shows a fifth virtual camera 630e below the toroidal object 650, pointing at it in the z-direction, and a sixth virtual camera 630f above the toroidal object, pointing at it in the −z-direction. The fifth and sixth virtual cameras 630e, 630f form a third pair of antipodal virtual cameras whose optical axes can be substantially collinear, and in this case they are illustrated as being aligned with the z-axis. The second and third pairs of virtual cameras are examples of the virtual cameras referenced in block 525 of FIG. 5B. In some embodiments, the respective axes joining each pair of antipodal virtual cameras are all mutually orthogonal to one another.

While FIG. 6 illustrates an example arrangement of virtual cameras, other arrangements can be used. For example, in some embodiments, the axes of one or more of the virtual cameras are not orthogonal to the axes of one or more other virtual cameras. In some embodiments, there are fewer or more antipodal pairs of virtual cameras than are illustrated in FIG. 6. In some embodiments, one or more of the virtual cameras are not located at antipodal points with respect to one or more other virtual cameras. Further, it is not required that the virtual cameras be aligned with the specific xyz axes illustrated in FIG. 6.

The first virtual camera 630a can capture, from its perspective, a fronto-parallel destructive image of the toroidal object 650. This would result in elimination of those points in the cloud which belong to the outer surface 652 of the toroidal object 650 and are visible to the first virtual camera 630a. The second virtual camera 630b can then capture a reverse-fronto-parallel destructive image of the toroidal object 650, which would result in elimination of those points in the cloud which belong to the outer surface 652 of the toroidal object 650 and are visible to the second virtual camera 630b. The second pair of virtual cameras 630c, 630d can then capture destructive images of the front and back orthogonal outer surfaces of the toroidal object 650, and the third pair of virtual cameras 630e, 630f can do the same for the bottom and top orthogonal surfaces of the toroidal object.

With reference back to FIG. 5B, the computer processor can now determine, at decision block 526, whether there are any remaining points in the unstructured point cloud. In this case, there will still be remaining points in the unstructured point cloud of the toroidal object 650 because some portions of the inner surface 654 will have been occluded from the virtual cameras 630 until after elimination of the points belonging to the outer surface 652 by destructive images. Thus, when the subject of the unstructured point cloud includes self-occluded surfaces, blocks 522-525 can be repeated as many times as necessary to fully destroy the unstructured point cloud.

As shown in FIG. 6, the computer processor can capture all surfaces of the subject of the unstructured point cloud using six virtual camera viewpoint locations (e.g., three mutually orthogonal antipodal pairs). This can result in N separate structured point cloud representations (e.g., RGBD images), where N≥6 and its specific value depends on the complexity of self-occlusions in the surfaces of the subject of the unstructured point cloud.

The destructive imaging procedure can be carried out for each of the static unstructured point clouds which collectively make up the dynamic unstructured point cloud that is being compressed. In some embodiments, this can result in six or more unstructured point cloud representations (e.g., RGBD images), or destructive images, of the subject for each frame of the dynamic unstructured point cloud.

As indicated at block 527 in FIG. 5B, in some embodiments, the computer processor can combine the destructive images for each frame of the dynamic unstructured point cloud into a single master image (e.g., a master RGBD image) per frame. The master images can then be assembled into a sequence to form a master video (e.g., a master RGBD video). An example method for doing this is illustrated in FIG. 5D, discussed below.

In some embodiments, the same set of virtual camera viewpoint locations and/or pointing angles are used for each of the intra-frame iterations of destructive image captures (e.g., according to blocks 522-525 in FIG. 5B), as well as for separate frames of the dynamic unstructured point cloud. In addition, in some embodiments, the virtual cameras 630 capture destructive images in the same order during each intra-frame iteration of destructive image captures, as well as for separate frames of the dynamic unstructured point cloud. This continuity in the viewpoint locations and pointing angles of the virtual cameras 630, and in the order in which destructive image are captured by the virtual cameras, can improve temporal coherency in local image regions of the master image sequence, which can improve compressibility of the master image sequence using video compression standards such as H.264, H.265, QuickTime RLE, etc.

In addition to capturing the destructive images themselves, the computer processor can also store metadata with each destructive image. The metadata can include, for example, an identification of the virtual camera which captured the destructive image, the viewpoint location and/or pointing angle of the virtual camera, the intrinsic parameters of the virtual camera, an identification of the frame of the dynamic unstructured point cloud to which the destructive image corresponds, and/or an identification of the intra-frame round of destruction during which the destructive image was captured. This metadata can be used in the reconstruction of the dynamic unstructured point cloud, as discussed below with respect to FIG. 8.

FIG. 5C is a flowchart of an example method 500C for selecting the initial viewpoint location of the virtual camera used to capture the first destructive image for each frame of the dynamic unstructured point cloud. This method can be used as part of block 522 in FIG. 5B. A similar method can be used as part of block 525 in FIG. 5B.

The method 500C begins at block 522a where the computer processor provides, or is provided with, a set of candidate viewpoint locations for the first virtual camera 630a. The candidates can be any viewpoint location around the perimeter of the unstructured point cloud that is being compressed. The candidate locations can be equally distributed around the unstructured point cloud, randomly spaced, etc. Any number of candidate locations can be tested. The pointing angle at each candidate location can be, for example, the angle which points the optical axis of the virtual camera toward the center of the point cloud.

Then, as indicated at block 522b, the method illustrated by blocks 522c-522e, can be carried out for each candidate viewpoint location. At block 522c, the computer processor determines which points from the point cloud belong to surfaces which are visible to the virtual camera from the candidate viewpoint location. The computer processor then forward-projects those points to the image plane of the virtual camera. The computer processor can do this for each frame of the dynamic unstructured point cloud that is being compressed. Then, at block 522d, the computer processor can calculate a measurement that is representative of the area of the projected image for each frame of the dynamic unstructured point cloud. This measurement can be, for example, the number or percentage of non-blank pixels in the projected image. This area metric may be negatively impacted when the surface is very complex and has many self-occluding portions. In such cases, a significant portion of the non-blank pixels may result from non-fronto-parallel portions of the surface; whenever a surface has a self-occlusion, and the occluding portion is itself curved, points on the edge of the occluding portion (as imaged by a given virtual camera) may be visible but highly non-fronto-parallel. These points can be detected if the point normals are known. Using the point normals, the computer processor can compute how fronto-parallel a given point is by, for example, comparing the surface normal for a given point to the ray connecting that point and the virtual camera's viewpoint location the more aligned these rays are, the more fronto-parallel the surface is at that point. In some embodiments, the area metric can be weighted, with points that are more fronto-parallel being weighted more heavily than points that are less fronto-parallel. In this way, candidate viewpoints which are more fronto-parallel to the point cloud can be preferred over candidate viewpoints which are less fronto-parallel.

At block 522e, the computer processor can then calculate the average area of the projected images which are captured from the candidate viewpoint location for all the frames of the dynamic unstructured point cloud. At decision block 522f, the computer processor determines whether there are additional candidate viewpoint locations to be tested. If there are, then the procedure shown by blocks 522c-522e can be repeated for the next candidate viewpoint location until there are none remaining. Finally, at block 522g, the computer processor can select the candidate viewpoint location which, over the course of all the frames of the dynamic unstructured point cloud, yields the projected images with the largest average area. The viewpoint location of the second virtual camera 630b can be selected as the antipode of the viewpoint location selected for the first virtual camera 630a.

A similar method can be used to select the viewpoint locations for the second pair of virtual cameras 630c, 630d. In the case of the second pair of virtual cameras, however, the candidate viewpoint locations in block 522a can be constrained to a ring around the unstructured point cloud which is oriented at a perpendicular angle to the axis that joins the first and second virtual cameras. From among these candidate viewpoint locations, the computer processor can select the one which yields the largest average projected image area to serve as the viewpoint location for the third virtual camera 630c. The viewpoint location of the fourth virtual camera 630d can be selected as the antipode of the viewpoint location selected for the third virtual camera 630c. Once the viewpoint locations for the second pair of virtual cameras have been selected, the third pair of virtual cameras 630e, 630f can be positioned at viewpoint locations along an axis which is perpendicular to the axes of both the first and second pairs of virtual cameras.

This selection technique helps to ensure that, over the course of all the frames of the dynamic unstructured point cloud, a greater proportion of points from the point cloud is eliminated earlier in the process of capturing destructive images of each frame of the dynamic unstructured point cloud. This can in turn reduce the number of iterations of destructive images that are needed for each frame of the dynamic unstructured point cloud. It also improves temporal coherency in the master video which is created from the destructive images (see FIGS. 5C and 7), which improves final compressibility.

While FIG. 5C illustrates an example method for selecting the viewpoint locations of the virtual cameras, other methods can also be used.

FIG. 5D is a flowchart of an example method 500D for mapping multiple destructive RGBD images of a dynamic unstructured point cloud into a single master RGBD video. This method can be used as part of block 527 in FIG. 5B.

Depending on factors such as the focal length and field of view of the virtual cameras 630, as well as the size of the unstructured point cloud, it may be that the destructive images can be cropped without losing any information. Thus, the rectangular bounds of all the destructive images (e.g., RGBD images) for the dynamic unstructured point cloud can be calculated. The rectangular bounds for each destructive image can indicate the location and size of a minimum bounding rectangle for the projected points in the image. These bounds can allow the destructive images for each frame of the dynamic unstructured point cloud to be cropped and embedded into a single master image per frame.

Thus, the method 500D begins at block 527a, where the computer processor determines the rectangular bounds of each of the destructive images for the dynamic unstructured point cloud that is being compressed. Then, at block 527b, the computer processor can determine the maximum bounds—across all frames of the dynamic unstructured point cloud—of the destructive images which were captured by each virtual camera during each intra-frame iterative round of destructive image capture.

In other words, let $DI_{i,j,k}$ represent the entire set of destructive images for the dynamic unstructured point cloud being compressed, where i is an index which represents the virtual camera, $VC_i$, used to capture a given destructive image, j is an index which represents the intra-frame iterative round of destructive image capture, and k is an index which represents the frame of the dynamic unstructured point cloud from which a given destructive image was captured. For example, if a particular frame of the dynamic unstructured point cloud requires two intra-frame rounds of destructive image capture from the six virtual cameras 630a-630f in order to fully destroy the point cloud, then $DI_{1,2,3}$ represents the destructive image which was captured by the first virtual camera 630a, during the second intra-frame round of destruction for the third frame of the dynamic unstructured point cloud.

The computer processor can then calculate $b_{i,j,k}$=bounds ($DI_{i,j,k}$), which are the bounds of all of the destructive images. Next, the computer processor can calculate $B_{i,j}$=max_bounds$_k$($b_{i,j,k}$), which are the maximum bounds, across all k, of the destructive images taken by the ith virtual camera during the jth intra-frame round of destruction.

Figure 7:
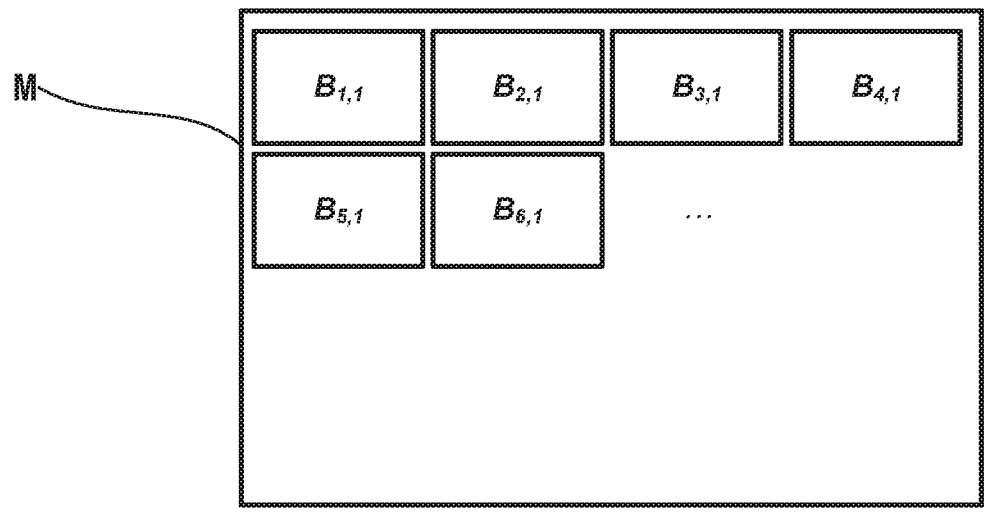
FIG. 7 illustrates an example of a master image template, M, and a master image $M_k$.
Figure 7:
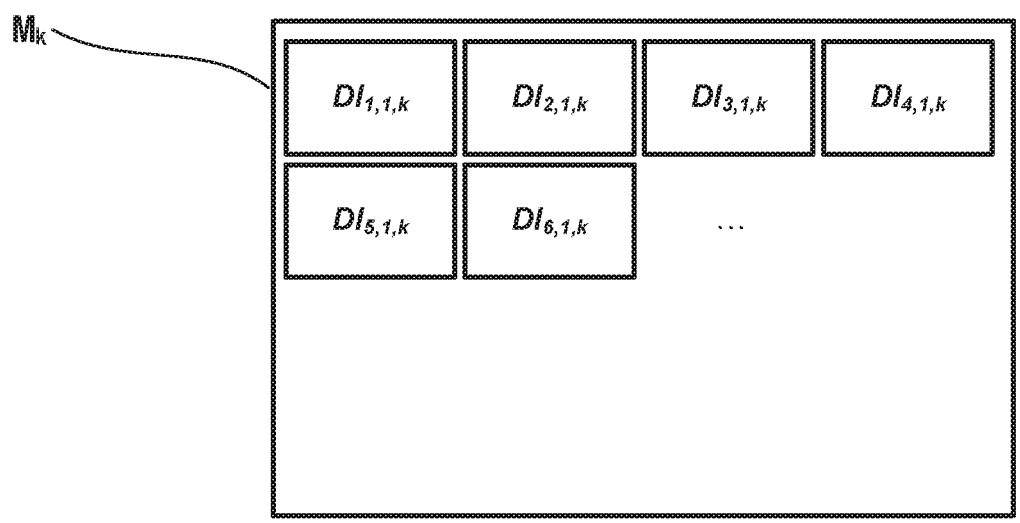

At block 527c, the computer processor can create a master image template, M, with a tiling pattern which will accommodate the maximum bounds, $B_{i,j}$, of the images, $DI_{i,j}$, across all k. FIG. 7 illustrates an example of the master image template, M. In the illustrated example, a rectangular space the size of the largest destructive image captured by the first virtual camera 630a during a first intra-frame round of destruction has been set aside in the template at the upper left corner. To the right of that space, the master image template has space set aside for the largest destructive image captured by the second virtual camera 630b during a first intra-frame round of destruction. In the same way, space is set aside in the master image template for the largest destructive images captured—over all frames of the dynamic unstructured point cloud—by each virtual camera during each intra-frame round of destruction. Although the master image template, M, illustrated in FIG. 7 only shows spaces set aside for first intra-frame round of destructive images, the template can set aside spaces for later intra-frame rounds of destructive images, as necessary. In addition, although the master image template, M, in FIG. 7 shows all of the reserved spaces being the same size, in general they can all be different sizes.

At block 527d, the computer processor can crop all of the destructive images, $DI_{i,j,k}$, using the maximum bounds, $B_{i,j}$. At block 527e, the computer processor can embed the destructive images that were captured from each frame of the dynamic unstructured point cloud into the master image template. This results in k master images, where $M_k$ is the master image for the kth frame of the dynamic unstructured point cloud. FIG. 7 illustrates an example of the master image, $M_k$, which includes all of the destructive images for a given frame of the dynamic unstructured point cloud tiled together. Thus, there is a single master image for each frame, and the layout of the master image is determined by the master image template. By tiling the destructive images together in the same way for each frame of the dynamic unstructured point cloud, temporal coherency between the destructive images captured by each virtual camera, during each round of destruction, is preserved.

Finally, at block 527*f*, the computer processor can create a master video, =[$M_1, M_2, M_3 \ldots M_k \ldots M_{NumFrames}$], which is a time sequence of the master images for the frames of the dynamic unstructured point cloud. This master video can then be compressed using video compression algorithms, such as, H.264, H.265, QuickTime RLE, etc.

Figure 8:
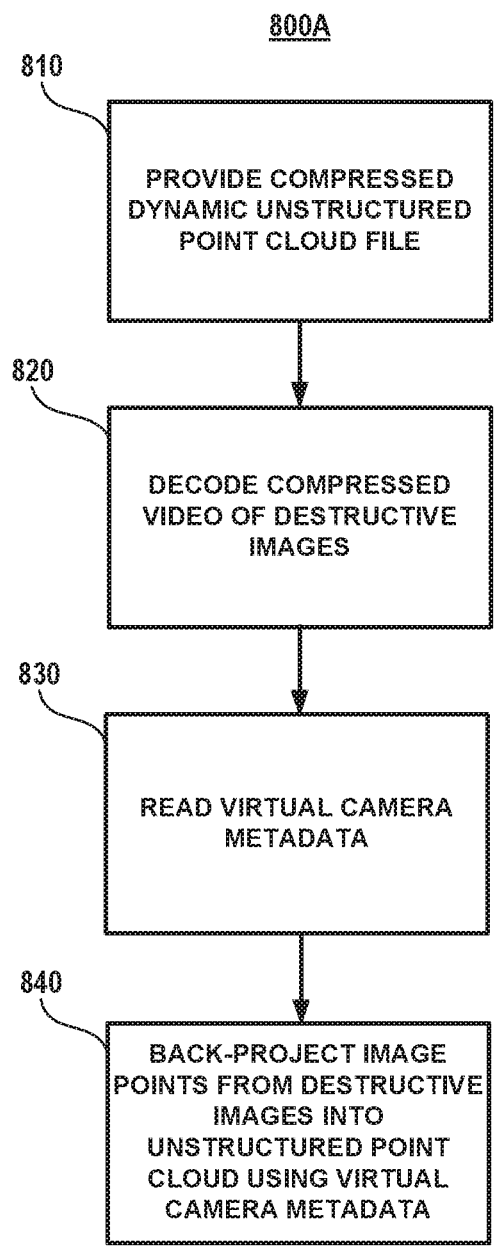
FIG. 8 is a flowchart of an example method for decoding a compressed dynamic unstructured point cloud into an uncompressed format.

FIG. 8 is a flowchart of an example method 800 for decoding a compressed dynamic unstructured point cloud into an uncompressed format. The method 800 can be used to reconstruct a dynamic unstructured point cloud which has been compressed according to the techniques described herein.

The method 800 begins at block 810, where the computer processor provides, or is provided with, a compressed dynamic unstructured point cloud file. At block 820, the computer processor decodes the compressed video of destructive images (e.g., the compressed master video, V) using the codec of whatever compression standard was used to compress the destructive images. This yields a sequence of uncompressed destructive image data. If the destructive images for each frame of the dynamic unstructured point cloud were assembled together into a master image, the master image can be unpacked into individual destructive images.

At block 830, the computer processor reads the virtual camera metadata for each destructive image from the file. As already discussed, this metadata can include, for example, an identification of the virtual camera which captured each destructive image, the viewpoint location and/or pointing angle of the virtual camera, the intrinsic parameters of the virtual camera, an identification of the frame of the dynamic unstructured point cloud to which the destructive image corresponds, and/or an identification of the intra-frame round of destruction during which the destructive image was captured. The metadata can also include the bounds information $B_{i,j}$ for all i,j.

At block 840, the virtual camera metadata can be used to reconstruct each frame of the dynamic unstructured point cloud from the corresponding destructive images. This can be done by back-projecting the destructive images into the 3-D space of the point cloud. This metadata can be used to appropriately position, configure, and/or order the virtual cameras for performing the back-projection of the destructive images. In some embodiments, the destructive images for each frame of the dynamic unstructured point cloud can be back-projected in reverse of the order in which they were captured. For example, destructive images from later rounds of destruction can be back-projected first. Similarly, destructive images captured by the sixth virtual 630*f* camera can be back-projected before those captured by the fifth virtual camera 630*e*, and so on. In other embodiments, however, the back-projection of the destructive images can be done in any other order or in parallel.

FIG. 9 is a table 900 which illustrates example data rates for the raw data produced by a volumetric capture system, as well as example data rates associated with different compression techniques. The example volumetric capture system has 60 cameras, with each camera capturing images at 30 frames per second and having 4096×3000 pixels with a hit depth of 8 bits. The volumetric capture system can output raw images for each camera, for each frame. The raw RGB image sequences captured by the cameras can have an approximate data rate of 177 Gbps. The raw RGB image sequences can be individually compressed if desired, for example, to transfer to a system that constructs a 3-D model of a subject based on the image data from the volumetric capture stage. If each of the RUB videos is individually compressed, the data rate can be reduced to approximately 3.1 Gbps, for a compression ratio of 1.75%. Meanwhile, construction of the 3-D model of the subject may yield a raw unstructured point cloud for each frame, and the raw dynamic unstructured point cloud computed from the RUB videos can have a data rate of approximately 1.2 Gbps. Finally, the dynamic unstructured point cloud can be compressed into an RGBD video, according to the techniques described herein, and can have a data rate of approximately 0.35 Gbps, which yields a compression ratio of 0.2% when compared to the raw data, or H.3% when compared to the compressed RGB videos.

EXAMPLE EMBODIMENTS

1. A method comprising: capturing a plurality of destructive images of a dynamic unstructured point cloud from a plurality of viewpoints using one or more virtual cameras; forming one or more sequences of the destructive images; and compressing the one or more sequences of destructive images.

2. The method of Example 1, wherein the dynamic unstructured point cloud comprises a sequence of multiple static unstructured point clouds.

3. The method of Example 2, further comprising, for each static unstructured point cloud in the sequence, capturing the plurality of destructive images from the plurality of viewpoints using the one or more virtual cameras.

4. The method of Example 3, wherein capturing each of the plurality of destructive images of each of the static unstructured point clouds comprises: identifying points in the static unstructured point cloud which belong to a surface that is visible to one of the one or more virtual cameras; forward-projecting the identified points into an image plane of the virtual camera; and eliminating the identified points from the static unstructured point cloud.

5. The method of Example 3, wherein capturing the plurality of destructive images for each static unstructured point cloud in the sequence comprises: capturing a first destructive image from a first viewpoint of the static unstructured point cloud; and capturing a second destructive image from a second viewpoint of the static unstructured point cloud that is the antipode of the first viewpoint.

6. The method of Example 5, wherein capturing the plurality of destructive images for each static unstructured point cloud in the sequence further comprises: capturing a third destructive image from a third viewpoint of the static unstructured point cloud; and capturing a fourth destructive image from a fourth viewpoint of the static unstructured point cloud that is the antipode of the third viewpoint, wherein a first axis between the first and second viewpoints is orthogonal to a second axis between the third and fourth viewpoints.

7. The method of Example 6, wherein capturing the plurality of destructive images for each static unstructured point cloud in the sequence further comprises: capturing a fifth destructive image from a fifth viewpoint of the static unstructured point cloud; and capturing a sixth destructive image from a sixth viewpoint of the static unstructured point cloud that is the antipode of the fifth viewpoint, wherein a third axis between the fifth and sixth viewpoints is orthogonal to the first and second axes.

8. The method of Example 7, wherein capturing the plurality of destructive images for each static unstructured point cloud in the sequence further comprises iteratively capturing destructive images from the first through sixth viewpoints until no points remain in the static unstructured point cloud.

9. The method of Example 7, further comprising using the same first through sixth viewpoints for each static unstructured point cloud in the sequence.

10. The method of Example 9, further comprising capturing the first through sixth destructive images from the first through sixth viewpoints in the same order for each static unstructured point cloud in the sequence.

11. The method of Example 5, further comprising selecting the first viewpoint by: determining, for a plurality of candidate viewpoints, a corresponding plurality of indicators of the average area of destructive images taken of the dynamic unstructured point cloud from the plurality of candidate viewpoints; and selecting the candidate viewpoint corresponding to the largest average area.

12. The method of Example 6, further comprising selecting the third viewpoint by: determining, for a plurality of candidate viewpoints, a corresponding plurality of indicators of the average area of destructive images taken of the dynamic unstructured point cloud from the plurality of candidate viewpoints; and selecting the candidate viewpoint corresponding to the largest average area, wherein the candidate viewpoints all lie in a disk that is orthogonal to the first axis between the first and second viewpoints.

13. The method of Example 3, further comprising, for each of the static unstructured point clouds in the sequence, assembling the destructive images into a master image.

14. The method of Example 13, further comprising forming a sequence of the respective master images for the static unstructured point clouds in the sequence, wherein compressing the sequence of destructive images comprises compressing the sequence of master images.

15. The method of Example 13, wherein assembling the master images for the static unstructured point clouds in the sequence comprises using a master image template which specifies the positions of the destructive images based on the respective viewpoints from which the destructive images were captured.

16. The method of Example 13, wherein assembling the master image for each of the static unstructured point clouds in the sequence comprises using a master image template which specifies the positions of the destructive images based on respective identifications of an iterative round of destruction during which the destructive images were captured.

17. The method of Example 1, wherein the destructive images comprise red-green-blue-depth (RGBD) images.

18. The method of Example 1, wherein compressing the sequence of destructive images comprises using the H.264 standard, the H.265 standard, or the QuickTime RLS standard.

19. The method of Example 3, further comprising decoding the compressed dynamic unstructured point cloud to an uncompressed format using metadata, for the plurality of destructive images, the metadata for each destructive image comprising: an identification of the virtual camera which captured the destructive image; an identification of the viewpoint of the virtual camera which captured the destructive image; an intrinsic parameter of the virtual camera which captured the destructive image; an identification of the static unstructured point cloud in the sequence to which the destructive image corresponds; or an identification of an iterative round of destruction during which the destructive image was captured.

20. The method of Example 19, further comprising providing the decoded dynamic unstructured point cloud to a virtual reality, augmented reality, or mixed reality display system for viewing by a user.

21. A system comprising: a hardware computing device; and a memory configured to store a dynamic unstructured point cloud and instructions which, when executed by the hardware computing device, cause the hardware computing device to perform a method comprising: capturing a plurality of destructive images of the dynamic unstructured point cloud from a plurality of viewpoints using one or more virtual cameras; forming one or more sequences of the destructive images; and compressing the one or more sequences of destructive images.

22. The system of Example 21, wherein the dynamic unstructured point cloud comprises a sequence of multiple static unstructured point clouds.

23. The system of Example 22, wherein the method performed by the hardware computing device further comprises, for each static unstructured point cloud in the sequence, capturing the plurality of destructive images from the plurality of viewpoints using the one or more virtual cameras.

24. The system of Example 23, wherein capturing each of the plurality of destructive images of each of the static unstructured point clouds comprises: identifying points in the static unstructured point cloud which belong to a surface that is visible to one of the one or more virtual cameras; forward-projecting the identified points into an image plane of the virtual camera; and eliminating the identified points from the static unstructured point cloud.

25. The system of Example 23, wherein capturing the plurality of destructive images for each static unstructured point cloud in the sequence comprises: capturing a first destructive image from a first viewpoint of the static unstructured point cloud; and capturing a second destructive image from a second viewpoint of the static unstructured point cloud that is the antipode of the first viewpoint.

26. The system of Example 25, wherein capturing the plurality of destructive images for each static unstructured point cloud in the sequence further comprises: capturing a third destructive image from a third viewpoint of the static unstructured point cloud; and capturing a fourth destructive image from a fourth viewpoint of the static unstructured point cloud that is the antipode of the third viewpoint, wherein a first axis between the first and second viewpoints is orthogonal to a second axis between the third and fourth viewpoints.

27. The system of Example 26, wherein capturing the plurality of destructive images for each static unstructured point cloud in the sequence further comprises: capturing a fifth destructive image from a fifth viewpoint of the static unstructured point cloud; and capturing a sixth destructive image from a sixth viewpoint of the static unstructured point cloud that is the antipode of the fifth viewpoint, wherein a third axis between the fifth and sixth viewpoints is orthogonal to the first and second axes.

28. The system of Example 27, wherein capturing the plurality of destructive images for each static unstructured point cloud in the sequence further comprises iteratively capturing destructive images from the first through sixth viewpoints until no points remain in the static unstructured point cloud.

29. The system of Example 27, wherein the method performed by the hardware computing device further comprises using the same first through sixth viewpoints for each static unstructured point cloud in the sequence.

30. The system of Example 29, wherein the method performed by the hardware computing device further comprises capturing the first through sixth destructive images from the first through sixth viewpoints in the same order for each static unstructured point cloud in the sequence.

31. The system of Example 25, wherein the method performed by the hardware computing device further comprises selecting the first viewpoint by: determining, for a plurality of candidate viewpoints, a corresponding plurality of indicators of the average area of destructive images taken of the dynamic unstructured point cloud from the plurality of candidate viewpoints; and selecting the candidate viewpoint corresponding to the largest average area.

32. The system of Example 26, wherein the method performed by the hardware computing device further comprises selecting the third viewpoint by: determining, for a plurality of candidate viewpoints, a corresponding plurality of indicators of the average area of destructive images taken of the dynamic unstructured point cloud from the plurality of candidate viewpoints; and selecting the candidate viewpoint corresponding to the largest average area, wherein the candidate viewpoints all lie in a disk that is orthogonal to the first axis between the first and second viewpoints.

33. The system of Example 23, wherein the method performed by the hardware computing device further comprises, for each of the static unstructured point clouds in the sequence, assembling the destructive images into a master image.

34. The system of Example 33, wherein the method performed by the hardware computing device further comprises forming a sequence of the respective master images for the static unstructured point clouds in the sequence, wherein compressing the sequence of destructive images comprises compressing the sequence of master images.

35. The system of Example 33, wherein assembling the master images for the static unstructured point clouds in the sequence comprises using a master image template which specifies the positions of the destructive images based on the respective viewpoints from which the destructive images were captured.

36. The system of Example 33, wherein assembling the master image for each of the static unstructured point clouds in the sequence comprises using a master image template which specifies the positions of the destructive images based on respective identifications of an iterative round of destruction during which the destructive images were captured.

37. The system of Example 21, wherein the destructive images comprise red-green-blue-depth (RGBD) images.

38. The system of Example 21, wherein compressing the sequence of destructive images comprises using the H.264 standard, the H.265 standard, or the QuickTime RLS standard.

39. The system of Example 23, wherein the method performed by the hardware computing device further comprises decoding the compressed dynamic unstructured point cloud to an uncompressed format using metadata for the plurality of destructive images, the metadata for each destructive image comprising: an identification of the virtual camera which captured the destructive image; an identification of the viewpoint of the virtual camera which captured the destructive image; an intrinsic parameter of the virtual camera which captured the destructive image; an identification of the static unstructured point cloud in the sequence to which the destructive image corresponds; or an identification of an iterative round of destruction during which the destructive image was captured.

40. The system of Example 39, further comprising a virtual reality, augmented reality, or mixed reality display system, wherein the method performed by the hardware computing device further comprises providing the decoded dynamic unstructured point cloud to the virtual reality, augmented reality, or mixed reality display system for viewing by a user.

41. A non-transitory computer-readable medium which, when read by a hardware computing device, causes the hardware computing device to perform a method comprising: capturing a plurality of destructive images of a dynamic unstructured point cloud from a plurality of viewpoints using one or more virtual cameras; forming one or more sequences of the destructive images; and compressing the one or more sequences of destructive images.

42. The computer-readable medium of Example 41, wherein the dynamic unstructured point cloud comprises a sequence of multiple static unstructured point clouds.

43. The computer-readable medium of Example 42, wherein the method performed by the hardware computing device further comprises, for each static unstructured point cloud in the sequence, capturing the plurality of destructive images from the plurality of viewpoints using the one or more virtual cameras.

44. The computer-readable medium of Example 43, wherein capturing each of the plurality of destructive images of each of the static unstructured point clouds comprises: identifying points in the static unstructured point cloud which belong to a surface that is visible to one of the one or more virtual cameras; forward-projecting the identified points into an image plane of the virtual camera; and eliminating the identified points from the static unstructured point cloud.

45. The computer-readable medium of Example 43, wherein capturing the plurality of destructive images for each static unstructured point cloud in the sequence comprises: capturing a first destructive image from a first viewpoint of the static unstructured point cloud; and capturing a second destructive image from a second viewpoint of the static unstructured point cloud that is the antipode of the first viewpoint.

46. The computer-readable medium of Example 45, wherein capturing the plurality of destructive images for each static unstructured point cloud in the sequence further comprises: capturing a third destructive image from a third viewpoint of the static unstructured point cloud; and capturing a fourth destructive image from a fourth viewpoint of the static unstructured point cloud that is the antipode of the third viewpoint, wherein a first axis between the first and second viewpoints is orthogonal to a second axis between the third and fourth viewpoints.

47. The computer-readable medium of Example 46, wherein capturing the plurality of destructive images for each static unstructured point cloud in the sequence further comprises: capturing a fifth destructive image from a fifth viewpoint of the static unstructured point cloud; and capturing a sixth destructive image from a sixth viewpoint of the static unstructured point cloud that is the antipode of the fifth viewpoint, wherein a third axis between the fifth and sixth viewpoints is orthogonal to the first and second axes.

48. The computer-readable medium of Example 47, wherein capturing the plurality of destructive images for each static unstructured point cloud in the sequence further comprises iteratively capturing destructive images from the first through sixth viewpoints until no points remain in the static unstructured point cloud.

49. The computer-readable medium of Example 47, wherein the method performed by the hardware computing device further comprises using the same first through sixth viewpoints for each static unstructured point cloud in the sequence.

50. The computer-readable medium of Example 49, wherein the method performed by the hardware computing device further comprises capturing the first through sixth destructive images from the first through sixth viewpoints in the same order for each static unstructured point cloud in the sequence.

51. The computer-readable medium of Example 45, wherein the method performed by the hardware computing device further comprises selecting the first viewpoint by: determining, for a plurality of candidate viewpoints, a corresponding plurality of indicators of the average area of destructive images taken of the dynamic unstructured point cloud from the plurality of candidate viewpoints; and selecting the candidate viewpoint corresponding to the largest average area.

52. The computer-readable medium of Example 46, wherein the method performed by the hardware computing device further comprises selecting the third viewpoint by: determining, for a plurality of candidate viewpoints, a corresponding plurality of indicators of the average area of destructive images taken of the dynamic unstructured point cloud from the plurality of candidate viewpoints; and selecting the candidate viewpoint corresponding to the largest average area, wherein the candidate viewpoints all lie in a disk that is orthogonal to the first axis between the first and second viewpoints.

53. The computer-readable medium of Example 3, wherein the method performed by the hardware computing device further comprises, for each of the static unstructured point clouds in the sequence, assembling the destructive images into a master image.

54. The computer-readable medium of Example 53, wherein the method performed by the hardware computing device further comprises forming a sequence of the respective master images for the static unstructured point clouds in the sequence, wherein compressing the sequence of destructive images comprises compressing the sequence of master images.

55. The computer-readable medium of Example 53, wherein assembling the master images for the static unstructured point clouds in the sequence comprises using a master image template which specifies the positions of the destructive images based on the respective viewpoints from which the destructive images were captured.

56. The computer-readable medium of Example 53, wherein assembling the master image for each of the static unstructured point clouds in the sequence comprises using a master image template which specifies the positions of the destructive images based on respective identifications of an iterative round of destruction during which the destructive images were captured.

57. The computer-readable medium of Example 41, wherein the destructive images comprise red-green-blue-depth (RGBD) images.

58. The computer-readable medium of Example 41, wherein compressing the sequence of destructive images comprises using the H.264 standard, the H.265 standard, or the QuickTime RLS standard.

59. The computer-readable medium of Example 53, wherein the method performed by the hardware computing device further comprises decoding the compressed dynamic unstructured point cloud to an uncompressed format using metadata for the plurality of destructive images, the metadata for each destructive image comprising: an identification of the virtual camera which captured the destructive image; an identification of the viewpoint of the virtual camera which captured the destructive image; an intrinsic parameter of the virtual camera which captured the destructive image; an identification of the static unstructured point cloud in the sequence to which the destructive image corresponds; or an identification of an iterative round of destruction during which the destructive image was captured.

60. The computer-readable medium of Example 59, wherein the method performed by the hardware computing device further comprises providing the decoded dynamic unstructured point cloud to a virtual reality, augmented reality, or mixed reality display system for viewing by a user.

OTHER CONSIDERATIONS

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method comprising:
   capturing a plurality of destructive images of a dynamic unstructured point cloud from a plurality of viewpoints using one or more virtual cameras;
   forming one or more sequences of the destructive images; and
   compressing the one or more sequences of destructive images.

2. The method of claim 1, wherein the dynamic unstructured point cloud comprises a sequence of multiple static unstructured point clouds.

3. The method of claim 2, further comprising, for each static unstructured point cloud in the sequence, capturing the plurality of destructive images from the plurality of viewpoints using the one or more virtual cameras.

4. The method of claim 3, wherein capturing each of the plurality of destructive images of each of the static unstructured point clouds comprises:
identifying points in the static unstructured point cloud which belong to a surface that is visible to one of the one or more virtual cameras;
forward-projecting the identified points into an image plane of the virtual camera; and
eliminating the identified points from the static unstructured point cloud.

5. The method of claim 3, wherein capturing the plurality of destructive images for each static unstructured point cloud in the sequence comprises:
capturing a first destructive image from a first viewpoint of the static unstructured point cloud; and
capturing a second destructive image from a second viewpoint of the static unstructured point cloud that is the antipode of the first viewpoint.

6. The method of claim 5, wherein capturing the plurality of destructive images for each static unstructured point cloud in the sequence further comprises:
capturing a third destructive image from a third viewpoint of the static unstructured point cloud; and
capturing a fourth destructive image from a fourth viewpoint of the static unstructured point cloud that is the antipode of the third viewpoint,
wherein a first axis between the first and second viewpoints is orthogonal to a second axis between the third and fourth viewpoints.

7. The method of claim 6, wherein capturing the plurality of destructive images for each static unstructured point cloud in the sequence further comprises:
capturing a fifth destructive image from a fifth viewpoint of the static unstructured point cloud; and
capturing a sixth destructive image from a sixth viewpoint of the static unstructured point cloud that is the antipode of the fifth viewpoint,
wherein a third axis between the fifth and sixth viewpoints is orthogonal to the first and second axes.

8. The method of claim 7, wherein capturing the plurality of destructive images for each static unstructured point cloud in the sequence further comprises iteratively capturing destructive images from the first through sixth viewpoints until no points remain in the static unstructured point cloud.

9. The method of claim 7, further comprising using the same first through sixth viewpoints for each static unstructured point cloud in the sequence.

10. The method of claim 9, further comprising capturing the first through sixth destructive images from the first through sixth viewpoints in the same order for each static unstructured point cloud in the sequence.

11. The method of claim 5, further comprising selecting the first viewpoint by:
determining, for a plurality of candidate viewpoints, a corresponding plurality of indicators of the average area of destructive images taken of the dynamic unstructured point cloud from the plurality of candidate viewpoints; and
selecting the candidate viewpoint corresponding to the largest average area.

12. The method of claim 6, further comprising selecting the third viewpoint by:
determining, for a plurality of candidate viewpoints, a corresponding plurality of indicators of the average area of destructive images taken of the dynamic unstructured point cloud from the plurality of candidate viewpoints; and
selecting the candidate viewpoint corresponding to the largest average area,
wherein the candidate viewpoints all lie in a disk that is orthogonal to the first axis between the first and second viewpoints.

13. The method of claim 3, further comprising, for each of the static unstructured point clouds in the sequence, assembling the destructive images into a master image.

14. The method of claim 13, further comprising forming a sequence of the respective master images for the static unstructured point clouds in the sequence, wherein compressing the sequence of destructive images comprises compressing the sequence of master images.

15. The method of claim 13, wherein assembling the master images for the static unstructured point clouds in the sequence comprises using a master image template which specifies the positions of the destructive images based on the respective viewpoints from which the destructive images were captured.

16. The method of claim 13, wherein assembling the master image for each of the static unstructured point clouds in the sequence comprises using a master image template which specifies the positions of the destructive images based on respective identifications of an iterative round of destruction during which the destructive images were captured.

17. The method of claim 1, wherein the destructive images comprise red-green-blue-depth (RGBD) images.

18. The method of claim 1, wherein compressing the sequence of destructive images comprises using the H.264 standard, the H.265 standard, or the QuickTime RLS standard.

19. The method of claim 3, further comprising decoding the compressed dynamic unstructured point cloud to an uncompressed format using metadata for the plurality of destructive images, the metadata for each destructive image comprising:
an identification of the virtual camera which captured the destructive image;
an identification of the viewpoint of the virtual camera which captured the destructive image;
an intrinsic parameter of the virtual camera which captured the destructive image;
an identification of the static unstructured point cloud in the sequence to which the destructive image corresponds; or
an identification of an iterative round of destruction during which the destructive image was captured.

20. The method of claim 19, further comprising providing the decoded dynamic unstructured point cloud to a virtual reality, augmented reality, or mixed reality display system for viewing by a user.

21. A system comprising:
a hardware computing device; and
a memory configured to store a dynamic unstructured point cloud and instructions which, when executed by the hardware computing device, cause the hardware computing device to perform a method comprising:
capturing a plurality of destructive images of the dynamic unstructured point cloud from a plurality of viewpoints using one or more virtual cameras;

forming one or more sequences of the destructive images; and compressing the one or more sequences of destructive images.

22. The system of claim 21, wherein the dynamic unstructured point cloud comprises a sequence of multiple static unstructured point clouds.

23. The system of claim 22, wherein the method performed by the hardware computing device further comprises, for each static unstructured point cloud in the sequence, capturing the plurality of destructive images from the plurality of viewpoints using the one or more virtual cameras.

24. The system of claim 23, wherein capturing each of the plurality of destructive images of each of the static unstructured point clouds comprises:

identifying points in the static unstructured point cloud which belong to a surface that is visible to one of the one or more virtual cameras;

forward-projecting the identified points into an image plane of the virtual camera; and eliminating the identified points from the static unstructured point cloud.

25. The system of claim 23, wherein capturing the plurality of destructive images for each static unstructured point cloud in the sequence comprises:

capturing a first destructive image from a first viewpoint of the static unstructured point cloud; and capturing a second destructive image from a second viewpoint of the static unstructured point cloud that is the antipode of the first viewpoint.

26. The system of claim 25, wherein capturing the plurality of destructive images for each static unstructured point cloud in the sequence further comprises:

capturing a third destructive image from a third viewpoint of the static unstructured point cloud; and capturing a fourth destructive image from a fourth viewpoint of the static unstructured point cloud that is the antipode of the third viewpoint, wherein a first axis between the first and second viewpoints is orthogonal to a second axis between the third and fourth viewpoints.

27. The system of claim 26, wherein capturing the plurality of destructive images for each static unstructured point cloud in the sequence further comprises:

capturing a fifth destructive image from a fifth viewpoint of the static unstructured point cloud; and capturing a sixth destructive image from a sixth viewpoint of the static unstructured point cloud that is the antipode of the fifth viewpoint, wherein a third axis between the fifth and sixth viewpoints is orthogonal to the first and second axes.

28. The system of claim 27, wherein capturing the plurality of destructive images for each static unstructured point cloud in the sequence further comprises iteratively capturing destructive images from the first through sixth viewpoints until no points remain in the static unstructured point cloud.

29. The system of claim 27, wherein the method performed by the hardware computing device further comprises using the same first through sixth viewpoints for each static unstructured point cloud in the sequence.

30. The system of claim 29, wherein the method performed by the hardware computing device further comprises capturing the first through sixth destructive images from the first through sixth viewpoints in the same order for each static unstructured point cloud in the sequence.

31. The system of claim 25, wherein the method performed by the hardware computing device further comprises selecting the first viewpoint by:

determining, for a plurality of candidate viewpoints, a corresponding plurality of indicators of the average area of destructive images taken of the dynamic unstructured point cloud from the plurality of candidate viewpoints; and selecting the candidate viewpoint corresponding to the largest average area.

32. The system of claim 26, wherein the method performed by the hardware computing device further comprises selecting the third viewpoint by:

determining, for a plurality of candidate viewpoints, a corresponding plurality of indicators of the average area of destructive images taken of the dynamic unstructured point cloud from the plurality of candidate viewpoints; and selecting the candidate viewpoint corresponding to the largest average area, wherein the candidate viewpoints all lie in a disk that is orthogonal to the first axis between the first and second viewpoints.

33. The system of claim 23, wherein the method performed by the hardware computing device further comprises, for each of the static unstructured point clouds in the sequence, assembling the destructive images into a master image.

34. The system of claim 33, wherein the method performed by the hardware computing device further comprises forming a sequence of the respective master images for the static unstructured point clouds in the sequence, wherein compressing the sequence of destructive images comprises compressing the sequence of master images.

35. The system of claim 33, wherein assembling the master images for the static unstructured point clouds in the sequence comprises using a master image template which specifies the positions of the destructive images based on the respective viewpoints from which the destructive images were captured.

36. The system of claim 33, wherein assembling the master image for each of the static unstructured point clouds in the sequence comprises using a master image template which specifies the positions of the destructive images based on respective identifications of an iterative round of destruction during which the destructive images were captured.

37. The system of claim 21, wherein the destructive images comprise red-green-blue-depth (RGBD) images.

38. The system of claim 21, wherein compressing the sequence of destructive images comprises using the H.264 standard, the H.265 standard, or the QuickTime RLS standard.

39. The system of claim 23, wherein the method performed by the hardware computing device further comprises decoding the compressed dynamic unstructured point cloud to an uncompressed format using metadata for the plurality of destructive images, the metadata for each destructive image comprising:

an identification of the virtual camera which captured the destructive image;

an identification of the viewpoint of the virtual camera which captured the destructive image;

an intrinsic parameter of the virtual camera which captured the destructive image;

an identification of the static unstructured point cloud in the sequence to which the destructive image corresponds; or an identification of an iterative round of destruction during which the destructive image was captured.

40. The system of claim 39, further comprising a virtual reality, augmented reality, or mixed reality display system, wherein the method performed by the hardware computing device further comprises providing the decoded dynamic unstructured point cloud to the virtual reality, augmented reality, or mixed reality display system for viewing by a user.

41. A non-transitory computer-readable medium which, when read by a hardware computing device, causes the hardware computing device to perform a method comprising:
- capturing a plurality of destructive images of a dynamic unstructured point cloud from a plurality of viewpoints using one or more virtual cameras;
- forming one or more sequences of the destructive images; and
- compressing the one or more sequences of destructive images.

* * * * *